(No Model.)
F. H. ROBIE.
STORE TONGS, &c.
No. 304,669. Patented Sept. 2, 1884.
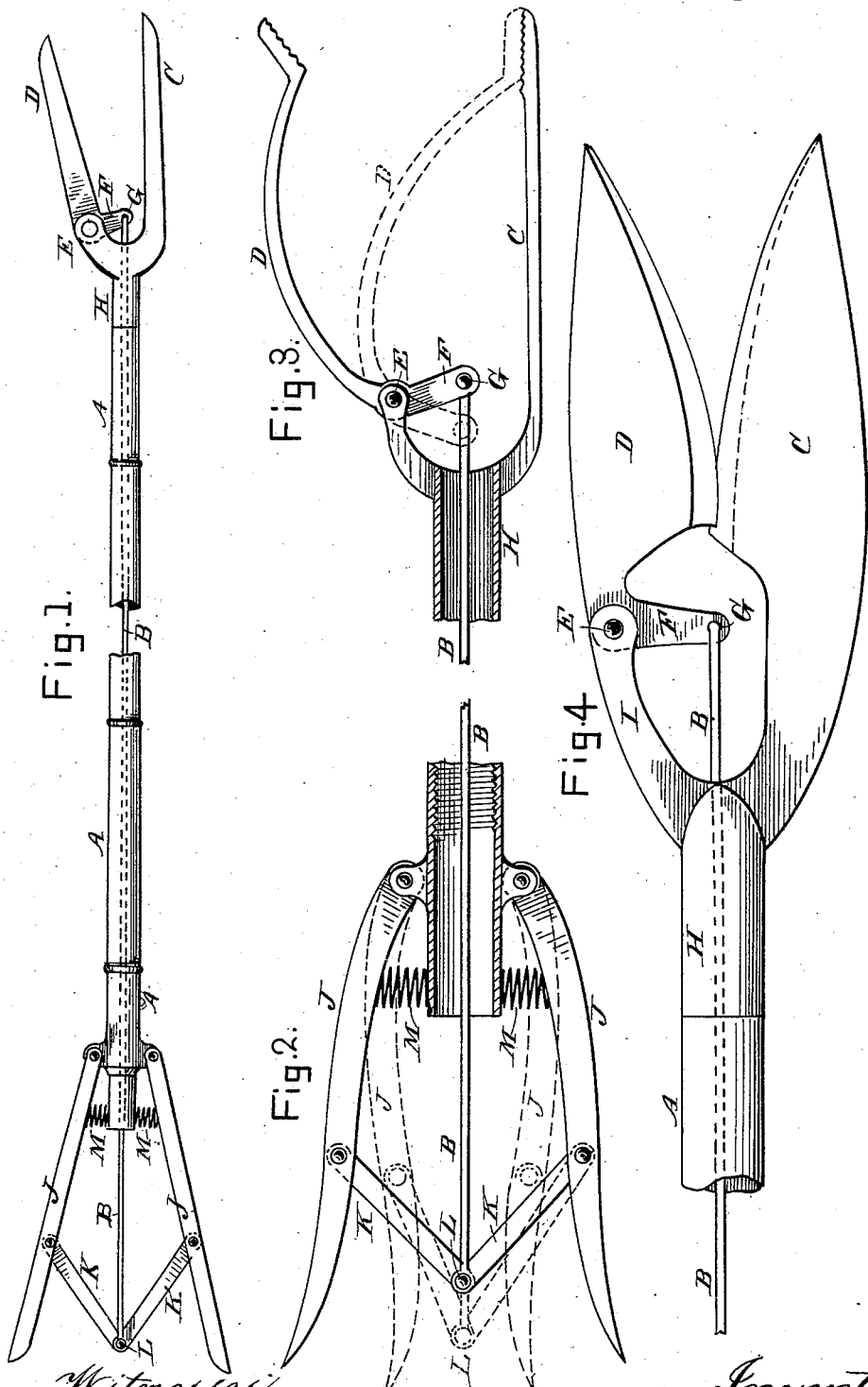
Witnesses:
E. A. Phelps.
F. A. Spencer.
Inventor:
Frederic H. Robie
by A. H. Spencer atty

UNITED STATES PATENT OFFICE.

FREDERIC H. ROBIE, OF QUINCY, ASSIGNOR OF ONE-HALF TO WM. P. BIGELOW, OF NATICK, MASSACHUSETTS.

STORE-TONGS, &c.

SPECIFICATION forming part of Letters Patent No. 304,669, dated September 2, 1884.

Application filed August 4, 1884. (No model.)

*To all whom it may concern:*

Be it known that I, FREDERIC H. ROBIE, a citizen of the United States, residing at Quincy, in the county of Norfolk and State of Massachusetts, have invented certain new and useful Improvements in Store-Tongs and Similar Articles; and I do hereby declare that the same are fully described in the following specification and illustrated in the accompanying drawings.

My invention is embodied in a store-tongs or similar device having a long staff or pole with a pair of clamping or cutting jaws at one end, a pair of spring-pressed pivoted handles at the other end, and a reciprocating connecting-rod united to the handles by links, forming a toggle-joint.

My improvement is applicable to a variety of uses, as in fruit-pickers and tree-trimmers employing cutting-jaws, or in library or store tongs with clamping jaws or fingers suitably shaped to seize books or light articles in positions not conveniently reached by the hands.

In the drawings, Figure 1 is a side view of my device, the center broken away. Fig. 2 is an enlarged view of the handles applied to the lower end of the staff; and Figs. 3 and 4 are illustrations of suitable clamps and cutters for the upper end.

The staff A is hollow to protect and conceal the reciprocating rod B; and I prefer to employ a bamboo stick for this purpose, being light, strong, and tubular naturally, and sufficiently ornamental. At the tip of the staff two clamping or cutting jaws, C D, are provided, the jaw C being preferably rigid and about parallel with the staff, or a prolongation of it, while the other, D, is pivoted, as at E, and has a lateral arm, F, to which the rod B is connected at G, so that the reciprocation of said rod will cause the free end of the pivoted jaw to approach to or come in contact with the upper jaw.

I find it most convenient to cast in one with the jaw C a tubular socket, H, which fits on the end of the staff A, and has a short arm, I, on which the jaw D is pivoted. The jaws will be so shaped as to best fit the general class of articles to be manipulated, and will be either sharp or blunt as circumstances may require.

The devices by which the jaws are operated are novel in construction and arrangement.

Two handles or hand-pieces, J J, are pivoted or united by springs to the butt-end of the handle A, and have between them two pivoted links, K K, united to each other and to the rod B by a pivot, L, forming with each handle a toggle-joint. The construction is such that when the hand-pieces J J are pressed toward each other by the hand of the operator the rod B is forced outwardly, as denoted in dotted lines in Fig. 2, bringing the jaws C D toward or into contact with each other, as indicated in Fig. 3. Springs M between the handles J J keep them normally separated and the jaws C D opened. This arrangement adapts the device to be worked with one hand, and to the greatest advantage, since merely the muscular grip of closing the hand is required, and through the toggle-joint J K L and rod B this grip is transferred to the jaws C D. This is a great improvement over those devices in which one hand must hold the staff while the other moves lengthwise thereof to work the jaws.

Instead of pivoting the handles J J to the staff A and employing the springs M, I sometimes unite the handles to the staff by flat springs riveted to each, to give the desired movements.

Where special strength is required, a second pair of handles may be provided at an intermediate point, to be worked, as above described, by the other hand.

A spring may be supplied to open the jaw D, if desired.

I claim as my invention—

1. The staff A, reciprocating rod B, and jaws C D, in combination with the spring-pressed handles J J and pivoted links K K, forming toggle-joints, substantially as set forth.

2. As a new article of manufacture, a gripping or cutting instrument consisting of a hollow staff having at one end a pair of closing jaws, and at the other end a pair of spring-pressed handles united by pivoted links to a reciprocating rod within said staff, whereby pressure of said handles toward each other closes the jaws, substantially as and for the purpose set forth.

In testimony whereof I hereto affix my signature in presence of two witnesses.

FREDERIC H. ROBIE.

Witnesses:
C. G. KEYES,
A. H. SPENCER.